United States Patent [19]
Klein

[11] 3,855,407
[45] Dec. 17, 1974

[54] METHOD OF PROTECTING THE SKIN WITH 5-(3,3-DIMETHYL-2-NORBORNYLIDENE)-3-PENTENE-2-ONE

[75] Inventor: Erich Klein, Holzminden, Germany

[73] Assignee: Dragoco Spezialfabrik konz, Riech- und Aromastoffe Gerberding & Co. GmbH, Holzminden, Germany

[22] Filed: Jan. 11, 1972

[21] Appl. No.: 216,923

Related U.S. Application Data

[63] Continuation-in-part of Ser. No. 791,781, Jan. 16, 1969, abandoned.

[30] Foreign Application Priority Data

Aug. 8, 1968 Austria .............................. 7757/68

[52] U.S. Cl.......... 424/59, 424/DIG. 1, 424/DIG. 2, 424/DIG. 5, 424/47, 424/70, 424/71, 424/73, 424/174, 424/365
[51] Int. Cl. .......................... A61k 9/06, A61l 23/00
[58] Field of Search...................... 424/331, 332, 59; 260/586 A, 587

[56] References Cited
OTHER PUBLICATIONS

Watanabe et al., Chemical Abstracts, 1965, Vol. 62, pp. 7802g and 7803.

*Primary Examiner*—Albert T. Meyers
*Assistant Examiner*—Dale R. Ore
*Attorney, Agent, or Firm*—Erich M. H. Radde

[57] ABSTRACT

The highly effective, stable preparation for protecting the human skin against the action of erythema-producing irradiation according to the present invention contains, as active light protective agent, 5-(3,3-dimethyl-2-norbornylidene)-3-pentene-2-one in effective amounts, preferably in amounts of 1 % to 2 %. The preparation is preferably prepared and applied to the human skin in the form of a cosmetic cream, an oily solution, or an aqueous emulsion. Concentrations as low as 0.1 % and even higher than 5 % can also be used. The compositions have proved to be valuable agents for retarding aging of the skin, to prevent decolorization of cosmetic preparations, such as shaving lotions, and for other purposes.

2 Claims, 1 Drawing Figure

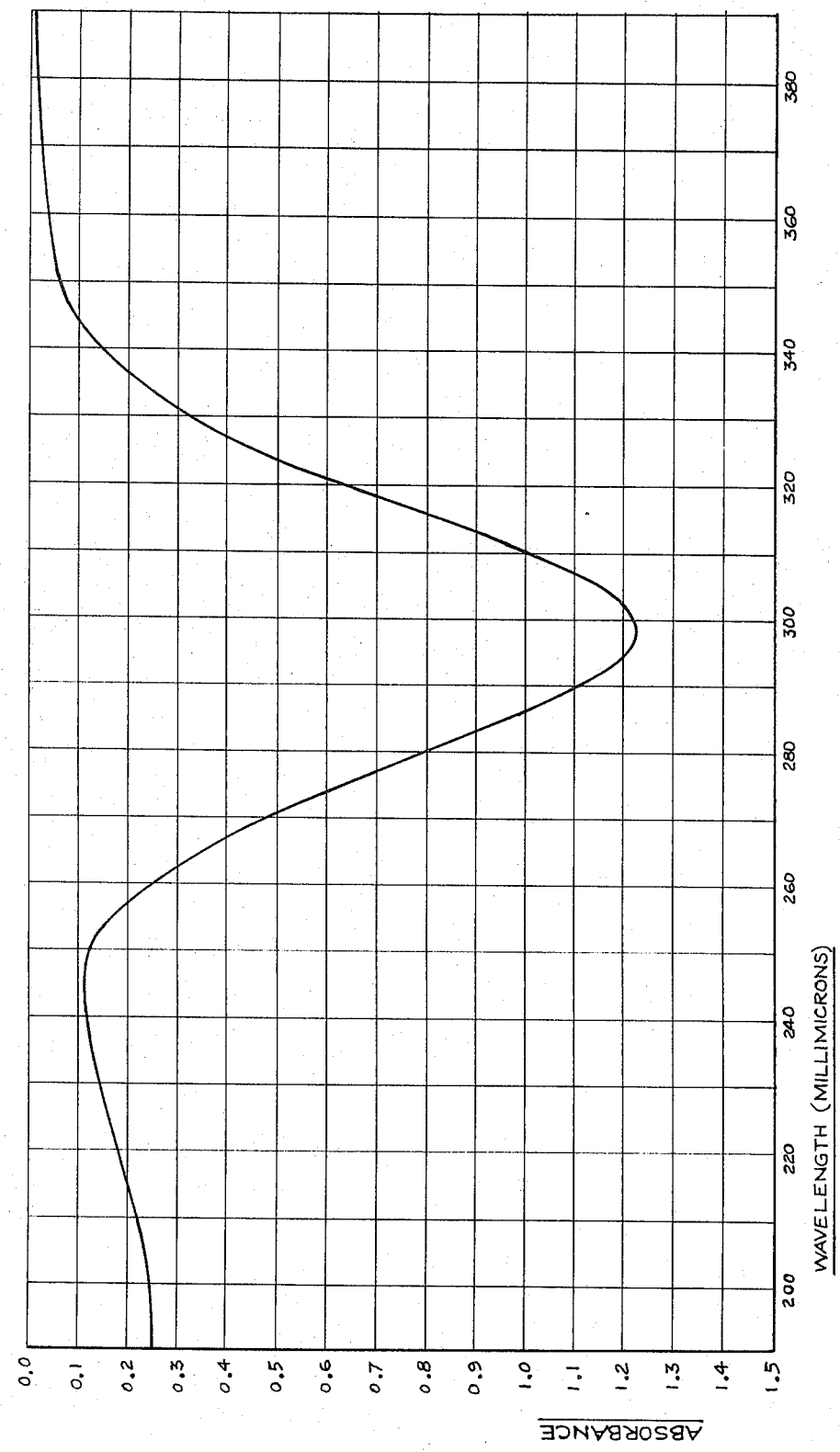

A METHOD OF PROTECTING THE SKIN WITH 5-(3,3-DIMETHYL-2-NORBORNYLIDENE)-3-PENTENE-2-ONE

CROSS-REFERENCE TO RELATED APPLICATION

The present application is a continuation-in-part of copending Application Ser. No. 791,781, filed Jan. 16, 1969, and entitled "PROTECTIVE AGENT AGAINST SUNBURN AND THE ACTION OF LIGHT," now abandoned.

BACKGROUND OF THE INVENTION

1. Field of the Invention

The present invention relates to a novel composition containing the acyclic conjugated dienone 5-(3,3-dimethyl-2-norbornylidene)-3-pentene-2-one, said composition being especially useful for protecting the human skin against solar radiation causing erythema, for their retarding effect upon aging of the human skin, for preventing or retarding decolorization of cosmetic preparations on storage, and for other purposes, and to a method of using said compound and compositions containing same for such purposes.

2. Description of the Prior Art

A considerable number of chemical compounds are used in cosmetic preparations as agents to protect the human skin against the action of light, such as salicylic acid derivatives, dibenzalazine, cinnamic acid derivatives, dibenzal acetone, esters of p-amino benzoic acid and p-dimethylamino benzoic acid, cinnamal acetophenone, naphthol sulfonates, coumarin derivatives, quinine salts, quinoline derivatives, and others. It may be noted that all of these known compounds possess an aromatic benzene nucleus which is essential for achieving the desired sunlight-absorbing properties. To be an effective sunscreening agent, such compounds should have their maximum absorption power approximately in the middle of the erythema-producing region of the sunlight between about 2,800 Angstrom and about 3,200 Angstrom, i.e. in its ultraviolet region, and should also have as high an extinction coefficient as possible so as to more or less quantitatively absorb the rays within said range.

Another important requirement to be met by such protective agents is that they be well tolerated by the human skin, even if applied repeatedly thereto. A number of the known sunscreen agents do not meet both requirements. Especially the compounds which contain a benzene nucleus are not always biologically unobjectionable.

WATANABE et al. have described a condensation product of 8-formyl camphene with acetone under the action of alkaline catalysts without giving any use of the resulting 5-(3,3-dimethyl-2-norbornylidene)-3-pentene-2-one or 8-(3-oxo-1-butenyl) camphene (see Chem. Abstr. vol. 62, 1965, page 7802 f.).

SUMMARY OF THE INVENTION

It is one object of the present invention to provide a highly effective and well tolerated, substantially non-toxic and non-irritating sunscreen and protective agent against the action of light which affords protection for a prolonged period of time, which is not discolored by sunlight, and which is compatible with the other ingredients of preparations containing such an agent.

Another object of the present invention is to provide a novel sunscreen and light protective composition containing such an effective agent in a relatively low concentration.

Still another object of the present invention is to provide a method of using such a preparation by applying it to the human skin.

Another object of the present invention is to provide a novel and highly effective composition to retard aging of the human skin.

A further object of the present invention is to provide a novel and highly effective additive to cosmetic preparations which prevents decolorization of such preparations on storage and exposure to light.

Other objects of the present invention and advantageous features thereof will become apparent as the description proceeds.

In principle the sunscreen and light protective agent according to the present invention is the alicyclic, conjugated dienone, 5-(3,3-dimethyl-2-norbornylidene)-3-pentene-2-one of the following formula

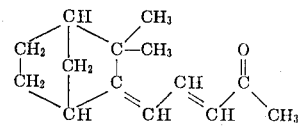

It meets substantially all requirements with respect to absorption of erythema-producing rays as well as tolerance by the human skin. This could not be foreseen because, according to Woodward's rule (R. B. WOODWARD, J. Am. Chem. Soc. 63, 1123 (1941); 64, 72 76 (1942) which is generally accepted by the art, one would expect that 5-(3,3-dimethyl-2-norbornylidene)-3-pentene-2-one have an absorption maximum of 2,860 Angstrom. In contrast to said rule its absorption maximum is between 2,950 Angstrom and about 3,050 Angstrom. Thus said compound is capable of absorbing substantially all the erythema-producing sun rays. Other advantages of said compound in comparison to heretofore used light protective agents are its excellent tolerance by the human skin even on repeated administration and its effectiveness in a concentration as low as 0.005 % and preferably in concentrations between about 1 % and about 5 %. Preferably said compound is admixed to suitable cosmetic preparations such as sunscreen oils, creams, sunscreen lotions, gels, ointments, stick products, and others. Furthermore, 5-(3,3-dimethyl-2-norbornylidene)- 3 -pentene-2-one is distinguished over known sunscreen and light protective agents by its stability in soap and aerosol propellants.

Cosmetic preparations are protected against discoloration if small amounts of 5-(3,3-dimethyl-2-norbornylidene)-3-pentene-2-one such as amounts as small as 0.005 % are added thereto. For instance, hair sprays are protected against the action of light by the addition of as little as 0.05 % of the active compound. Likewise, amounts of 0.1 % of said compound added to shaving lotions prevent their discoloration.

The 5-(3,3-dimethyl-2-norbornylidene)-3-pentene-2-one has also proved of value as skin aging preventing or retarding agent when added to skin nourishing creams and the like preparations.

Types of cosmetic preparations to which the active agent is added are, for instance, creams, ointments, pastes, or salves based on vegetable oils and fats, on mineral oils and paraffins, on waxes and esters of higher fatty acids with higher fatty alcohols such as wool fat, wool wax, lanolin, on polyglycol ethers, on higher fatty alcohols and higher fatty acids, or on mixtures thereof. Furthermore, oil-in-water emulsions or water-in-oil emulsions having the active agent finely dispersed or emulsified therein may also be improved in their stability against solar radiation and against discoloration. Thereby, suitable emulsifiers may be employed such as the alkali metal salts, ammonium salts, or amine salts of high molecular fatty acids, the salts of sulfuric acid esters of fatty alcohols, the fatty acid esters of polyhydroxy ethylene ethers, for instance, with hexites such as the polyhydroxy ethylene sorbitan monolaurate and others.

BRIEF DESCRIPTION OF THE DRAWING

The attached curve illustrates the high absorptive power of an 0.048 % solution of 5-(3,3-dimethyl-2-norbornylidene)-3-pentene-2-one in ethanol within the range between 280 m$\mu$ and 315 m$\mu$, i.e. the range of erythemogenic action. It is evident that the long-wave ultraviolet radiation of 310 m$\mu$ to 400 m$\mu$ which is capable of augmenting skin pigmentation, is not absorbed.

DESCRIPTION OF THE PREFERRED EMBODIMENTS

The following examples serve to illustrate the present invention without, however, limiting the same thereto.

Example 1

Sunscreen Oil

| | |
|---|---|
| 5-(3,3-Dimethyl-2-norbornylidene)-3-pentene-2-one | 2 parts |
| Petrolatum | 28 parts |
| Olive oil | 70 parts |
| Perfume and preservative | as required. |

Example 2

Sunscreen cream

| | | |
|---|---|---|
| 5-(3,3-Dimethyl-2-norbornylidene)-3-pentene-2-one | | 2 parts |
| Beeswax | | 20 parts |
| Lanolin | | 10 parts |
| Glycerol | | 3 parts |
| Aluminum stearate | | 2 parts |
| Perfume and preservative | | as required |
| Water | to make | 100 parts |

Example 3

Sunscreen lotion in emulsion form

| | | |
|---|---|---|
| 5-(3,3-Dimethyl-2-norbornylidene)-3-pentene-2-one | | 1 part |
| Petrolatum | | 3 parts |
| Cetyl alcohol ethoxylate (mono-ethylene glycol ether of cetyl alcohol) | | 6 parts |
| 70% sorbitol solution | | 3 parts |
| Glycerol monostearate | | 6 parts |
| Perfume and preservative | | as required |
| Water | to make | 100 parts |

Example 4

Sunscreen cream

| | | |
|---|---|---|
| 5-(3,3-Dimethyl-2-norbornylidene)-3-pentene-2-one | | 1 part |
| Diethylene glycol monostearate | | 12 parts |
| Isopropyl myristate | | 3 parts |
| Petrolatum | | 2 parts |
| Glycerol | | 3 parts |
| Perfume and preservative | | as required |
| Water | to make | 100 parts |

Example 5

Hair spray

| | | |
|---|---|---|
| Copolymerization product of vinyl acetate and crotonic acid | 3.5 | parts |
| Amino methyl propanediol | 0.3 | parts |
| Silicone oil | 0.1 | parts |
| Perfume oil | 0.2 | parts |
| Methylene chloride | 25.0 | parts |
| Tinuvin (p-benzotriazole derivative) | 0.04 | parts |
| 2,2'-4,4'-(Hydroxy benzophenone) | 0.08 | parts |
| 5-(3,3-Dimethyl-2-norbornylidene)-3-pentene-2-one | 0.08 | parts |
| Solvent | 70.0 | parts |

60% of said mixture and 40% of a commercial propellant are filled into spray containers.

Example 6

Nourishing cream with skin aging retarding agent

| | | |
|---|---|---|
| Sorbitan sesquioleate | 5.0 | parts |
| Woolwax alcohol | 5.0 | parts |
| Lanolin | 5.0 | parts |
| Petrolatum | 16.0 | parts |
| Isopropylmyristate | 3.0 | parts |
| 2,2'-4,4'(Hydroxy benzophenone) | 0.5 | parts |
| Sorbitol 70% | 5.0 | parts |
| Magnesium sulfate | 0.5 | parts |
| Perfume oil, antioxidant, preserving agent | 0.5 | parts |
| 5-(3,3-Dimethyl-2-norbornylidene)-3-pentene-2-one | 0.5 | parts |
| Water | 59.0 | parts |

Example 7

Shaving lotion

| | | |
|---|---|---|
| Hamamelis water | 3.0 | parts |
| Menthol | 0.1 | parts |
| Diisopropyladipate | 3.0 | parts |
| Castor oil hydroxylate with 40 moles of ethylene oxide | 0.3 | parts |
| 2,2'-Hydroxy-4,4'-methoxy benzophenone | 0.1 | parts |
| Ethanol | 75.0 | parts |
| 5-(3,3-Dimethyl-2-norbornylidene)-3-pentene-2-one | 0.1 | parts |
| Dyestuff (Patent blue 5) | 0.0003 | parts |
| Water with perfume oil | 18.4 | parts |

Example 8

Hair grooming aid

| | | |
|---|---|---|
| Polyvinylpyrrolidone | 2.0 | parts |
| Polyhydroxy ethylene sorbitan monolaurate | 0.5 | parts |
| 2,2'-4,4'-hydroxy benzophenone | 0.2 | parts |
| Perfume oil | 0.3 | parts |
| 5-(3,3-Dimethyl-2-norbornylidene)-3-pentene-2-one | 0.4 | parts |
| Isopropyl alcohol | 47.0 | parts |
| Water | 49.6 | parts |

Example 9

Sun screen gel

| | | |
|---|---|---|
| Carboxy vinyl copolymerization product | 1.0 | part |
| Castor oil hydroxy ethylate with 40 moles of ethylene oxide | 3.0 | parts |
| Mono-isopropanolamine | 0.1 | parts |
| Perfume oil | 0.4 | parts |
| 5-(3,3-Dimethyl-2-norbornylidene)-3-pentene-2-one | 2.0 | parts |
| Ethanol | 48.0 | parts |
| Water | 45.5 | parts |

Example 10

Fat containing sun screen gel

| | | |
|---|---|---|
| Mono-ethanolamine salt of the ester of orthophosphoric acid with mono- and dialkyl polyglycol ethers | 18.0 | parts |
| Alkyl polyglycol ether emulsifier | 2.0 | parts |
| Paraffin oil | 10.0 | parts |
| Diisopropyladipate | 3.0 | parts |
| Chloro acetamide | 0.2 | parts |
| Polyethylene glycol 200 | 14.7 | parts |
| Perfume oil | 0.6 | parts |
| 5-(3,3-Dimethyl-2-norbornylidene)-3-pentene-2-one | 1.5 | parts |
| Water | 50.0 | parts |

Example 11

Sun screen stick

| | | |
|---|---|---|
| Nonyl phenol hydroxy ethylate with 9 moles of ethylene oxide | 4.2 | parts |
| Diethylene glycol mono-ether | 30.0 | parts |
| 1,2-Propylene glycol | 39.5 | parts |
| Glycerol | 6.5 | parts |
| Sodium stearate | 7.0 | parts |
| Perfume oil | 0.6 | parts |
| 5-(3,3-Dimethyl-2-norbornylidene)-3-pentene-2-one | 2.5 | parts |
| Water | 9.7 | parts |

The compositions of the aforesaid examples are prepared in a manner known per se. These compositions are evenly applied to the skin and especially to those parts of the skin which are exposed to the action of sunlight. They protect the thus covered skin against the erythemaproducing rays for 2 to 4 hours.

Of course, many changes and variations in the composition of the sunscreen preparations may be made by those skilled in the art in accordance with the principles set forth herein and in the claims annexed hereto.

I claim:

1. A method of protecting the human skin against the action of erythema-producing irradiation, said method comprising applying to the human skin an effective amount of a preparation comprising a cosmetically acceptable carrier and from about 0.005 to 5.0% of 5-(3,3-dimethyl-2-norbornylidene)-3-pentene-2-one incorporated in said carrier.

2. The method of claim 1, in which the preparation applied to the human skin is a preparation having between about 1% and about 2% of 5-(3,3-dimethyl-2-norbornylidene)-3-pentene-2-one incorporated in said carrier.

* * * * *